United States Patent [19]

Le Davay et al.

[11] 4,198,121
[45] Apr. 15, 1980

[54] COATING FOR OPTICAL FIBRES

[75] Inventors: Louis Le Davay, Louveciennes; Robert Jocteur, Lyon, both of France

[73] Assignee: Les Cables de Lyon, Lyon, France

[21] Appl. No.: 589,826

[22] Filed: Jun. 24, 1975

[30] Foreign Application Priority Data

Jul. 16, 1974 [FR] France .................. 74 24709

[51] Int. Cl.² .......................... G02B 5/14; B05D 3/04
[52] U.S. Cl. ............................ 350/96.30; 350/96.34; 427/163
[58] Field of Search ................. 427/163, 340, 248 H; 350/96 R, 96 M, 96 WG, 96.30, 96.34; 428/524; 260/59 R

[56] References Cited

U.S. PATENT DOCUMENTS

| | | | |
|---|---|---|---|
| 3,409,579 | 11/1968 | Robins | 260/59 |
| 3,429,848 | 2/1969 | Robins | 260/59 |
| 3,556,635 | 1/1971 | Schrenk et al. | 350/96 B |
| 3,718,383 | 2/1973 | Moore | 350/96 GN |
| 3,822,226 | 7/1974 | Taft et al. | 260/59 |

*Primary Examiner*—James R. Hoffman
*Attorney, Agent, or Firm*—Sughrue, Rothwell, Mion, Zinn and Macpeak

[57] ABSTRACT

Coating for optical fibres comprising at least one layer of a resinous composition which hardens in the cold and in a few seconds upon contact with a gaseous catalyst applicable more particularly to optical fibres intended to be assembled together in a cable.

3 Claims, No Drawings

COATING FOR OPTICAL FIBRES

BACKGROUND OF THE INVENTION

1. Field of the Invention

The invention concerns guides for light-waves known under the name of optical fibres.

2. Description of the Prior Art

The optical fibres are fragile because of their small diameter which is of the order of 100 microns and because of the nature of the material of which they are constituted. So that they may be manipulated and assembled in a cable, they must be protected and reinforced mechanically by an exterior coating.

Exterior coatings for optical fibres have already been produced with the aid of a liquid thermosetting coating. But the application of the thermal treatment which is necessary for the hardening of the coating has proved to be delicate and costly to implement industrially. Indeed, it necessitates a substantial investment for ovens of regulated temperature and involves a complex feed path with frequent feedback of the fibre which gives rise to microfractures leading to an increase in the coefficient of weakness of the fibre.

SUMMARY OF THE INVENTION

The present invention has for its object an exterior coating for optical fibres which is simple and cheap to produce industrially without imposing mechanical constraints on the fibres which are likely to increase their coefficient of weakness.

A further object is a coating for optical fibres comprising at least one layer of a resinous composition which is hardenable at ambient temperature and in a few seconds upon contact with a catalyst which is gaseous or diluted in a gas.

DETAILED DESCRIPTION OF THE INVENTION

According to one particular method of production, the resinous composition is a solution in an organic solvent of a phenolic resin and an isocyanate which hardens on contact with a very small quantity of tertiary amine which is gaseous or diluted in a gas, at ambient temperature and in a few seconds. For the choice of different products and of their proportion, reference should be made to foundry techniques for carrying out cold moulding in hard sand where the use of these products is well known.

The application of such a coating to an optical fibre can be carried out industrially in a continuous manner by passing the optical fibre through a bath of the resinous composition, then passing it through a reaction chamber into which the gaseous catalyst is introduced. During the process, the optical fibre can remain substantially rectilinear such that the fibre is not subjected to any mechanical deformation which is likely to lead to microfractures and to increase fibre weakness. It is possible to proceed with the application of several successive layers provided that between each layer the optical fibre is pased through a de-gasing chamber where excess amine is removed.

The application of such a coating is simple to implement industrially. It is cheap because of the absence of thermal treatment. It also allows an improvement in the rate of production because of the reduction in hardening time.

We claim:

1. A coated optical fibre comprising an optical fibre coated with at least one layer of a hardened resinous composition comprising the reaction product of a phenolic resin and an isocyanate hardened at ambient temperature and in a few seconds on contact with a catalytic amount of a tertiary amine which is gaseous or is suspended in a gas.

2. The coated optical fibre according to claim 1, wherein said resinous composition consists essentially of said reaction product.

3. A process for producing the coated optical fibre according to claim 1, comprising coating an optical fibre with a layer of a resinous composition by passing the optical fibre through an organic solvent solution of the resinous composition, said resinous composition comprising a phenolic resin and an isocyanate and being hardenable at ambient temperature and in a few seconds on contact with a catalytic amount of a gaseous catalyst comprising a tertiary amine which is gaseous or suspended in a gas, and then hardening the resinous composition layer on the optical fibre by passing the optical fibre coated with the layer of the resinous composition through a reaction zone into contact with the gaseous catalyst, the optical fibre remaining substantially rectilinear during the process.

* * * * *